(12) United States Patent
Hinkel

(10) Patent No.: US 11,662,708 B2
(45) Date of Patent: May 30, 2023

(54) METHOD OF FORMING A TWO-DIMENSIONAL IMAGE OVER A MODEL

(71) Applicant: Scott Hinkel, Yarmouth, ME (US)

(72) Inventor: Scott Hinkel, Yarmouth, ME (US)

( * ) Notice: Subject to any disclaimer, the term of this patent is extended or adjusted under 35 U.S.C. 154(b) by 233 days.

(21) Appl. No.: 16/580,727

(22) Filed: Sep. 24, 2019

(65) Prior Publication Data

US 2020/0096969 A1 Mar. 26, 2020

Related U.S. Application Data

(60) Provisional application No. 62/735,948, filed on Sep. 25, 2018.

(51) Int. Cl.
*B29C 51/10* (2006.01)
*B29C 51/14* (2006.01)
*G05B 19/4099* (2006.01)

(52) U.S. Cl.
CPC .......... *G05B 19/4099* (2013.01); *B29C 51/10* (2013.01); *B29C 51/14* (2013.01); *G05B 2219/35115* (2013.01)

(58) Field of Classification Search
CPC .......... B29C 51/10; B29C 51/14; B29C 51/12
See application file for complete search history.

(56) References Cited

U.S. PATENT DOCUMENTS

| 8,406,508 | B2 | 3/2013 | Pollack et al. | |
|---|---|---|---|---|
| 11,173,648 | B2 * | 11/2021 | Teramoto | B29C 51/165 |
| 11,235,508 | B2 * | 2/2022 | Hills | B29C 51/22 |
| 2003/0041962 | A1 * | 3/2003 | Johnson | B32B 27/308 |
| | | | | 156/266 |
| 2006/0147240 | A1 * | 7/2006 | Wolf | B41J 11/002 |
| | | | | 400/611 |
| 2008/0106006 | A1 * | 5/2008 | Fraillon | A45D 40/00 |
| | | | | 264/571 |
| 2009/0080032 | A1 * | 3/2009 | Simons | G05B 19/4099 |
| | | | | 358/450 |
| 2010/0080968 | A1 * | 4/2010 | Mizuno | B32B 21/06 |
| | | | | 428/205 |
| 2013/0105077 | A1 * | 5/2013 | Kessler | B29C 51/16 |
| | | | | 156/285 |
| 2018/0223142 | A1 * | 8/2018 | Walker, Jr. | B32B 27/00 |
| 2021/0101376 | A1 * | 4/2021 | Ochi | B32B 27/304 |

FOREIGN PATENT DOCUMENTS

WO WO-2013154695 A2 * 10/2013 ........... B32B 27/304

* cited by examiner

*Primary Examiner* — Daniel J Colilla

(57) ABSTRACT

A method of thermoforming a printed two-dimensional ("2D") image over a three dimensional ("3D") model that is not distorted when applied to the model and that need not be distorted in order to have the proper appearance on the model.

8 Claims, 3 Drawing Sheets

METHOD OF FORMING A TWO-DIMENSIONAL IMAGE OVER A MODEL

BACKGROUND INFORMATION

Field of the Invention

The invention relates to methods of applying a two-dimensional image to a model having more than two dimensions and more specifically methods that use a thermoform process to apply said image.

Discussion of Prior Art

Methods of creating three-dimensional ("3D") representations of two-dimensional ("2D") subjects are known in the art, however, all are significantly more cumbersome than is desirable, and none produce the high-quality results that are needed.

In general, most known methods of applying a 2D image to a 3D model use vacuum forming machines to adhere the image onto the model. A number of issues arise, however, in the use of this process. The crux of the issue is that 2D images must be stretched in order to fit a 3D model. In doing so, the image is distorted and no longer has the desired appearance. To account for this, methods have been created to calculate the distortion after which the image is reprinted in a 2D form that is itself distorted so that the image will look more natural when applied to the 3D model. This process is cumbersome and still does not reveal the desired level of quality.

Additionally, the idea of using flexible thermoformable ink using a flatbed printer over a roll-to-roll printer, and printing directly to a substrate in hopes of obtaining a clean and clear outcome, is also known. However, this process results in a washed out look due to the fact stretchable inks are not designed to pull and stretch to the degree needed for photo-realistic images. Additionally, frequently the ink will stick to the substrate as it is stretched and pulled giving the image a crackled paint look on the model.

It is also difficult to form a 2D image onto a 3D model without an amount of "bubbling", wherein small air bubbles are inserted between the 2D image and the 3D model. This lessens the quality of the image, and also increases the likelihood that the printed 2D image will eventually separate from the 3D model.

What is needed, therefore, is a method of applying a 2D image to a 3D model without needing to manipulate either the image or the model. What is further needed is such a method that results in a high quality image without defects such as air bubbles.

BRIEF SUMMARY OF THE INVENTION

The invention is a method of thermoforming a printed two-dimensional ("2D") image over a three-dimensional ("3D") model that is not distorted when applied to the model and that need not be distorted in order to have the proper appearance on the model. Three-dimensions as used in this disclosure shall include all objects having anything more than two dimension, such that at least some surface area comes up or out from a 2D surface, for example a surface that is merely punched forward, up to and including objects having a full 360 degrees of surface area. The method may also be used to apply a 2D image onto a 2D model/material.

The method primarily accomplishes this task by saturating a vinyl material with ink to display the image on a 2D surface and then applying that saturated vinyl material to a vacuum formable material. The combined vinyl and vacuum formable material is then vacuum formed to the 3D model using a vacuum forming machine that has been modified to heat the combined material from the bottom up, i.e., from underneath the materials rather than from above the materials in the conventional manner.

The method heats and stretches the layered materials over the 3D model in a manner that neither distorts nor degrades the image, resulting in a 3D model that is as clear as natural as the original 2D image.

The method may also include the use of a high heat engineered mastic to strengthen the bond between layers. An ultra violet ("UV") layer may also be applied in order to increase the durability and long-lasting nature of the resulting 3D image. Finally, heating the combination of materials from the bottom, essentially heating through the substrate, reduces damage to the UV laminate and vinyl keeping the degradation over time to the minimum.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
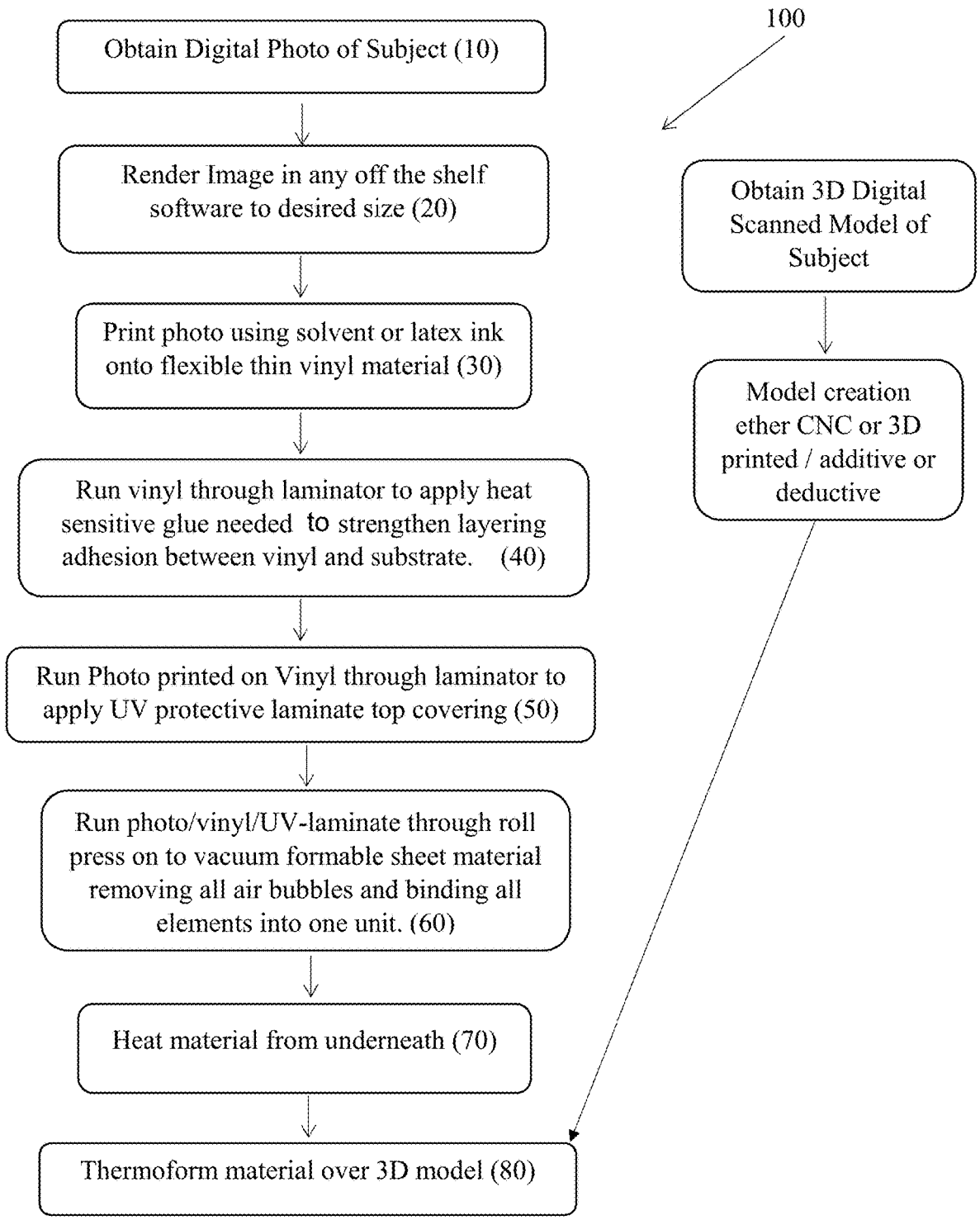
FIG. 1 is a flow chart illustrating the steps in the method.
Figure 2:
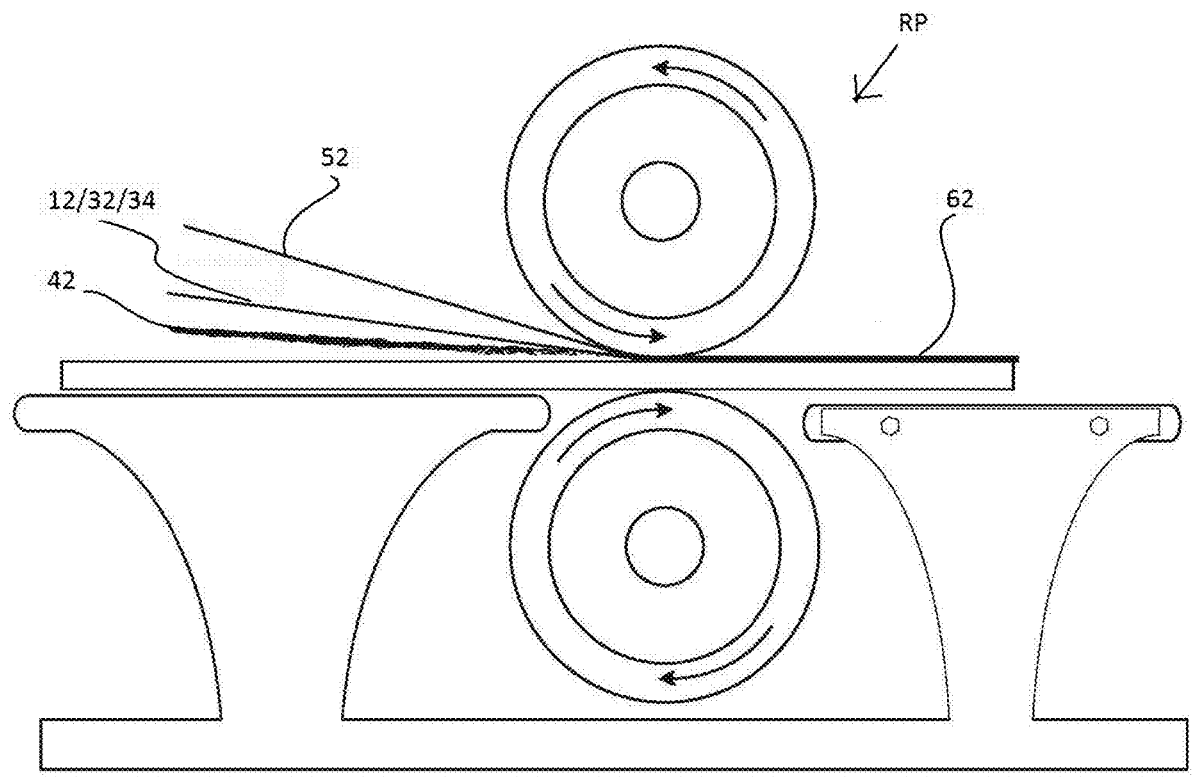
FIG. 2 is a side view of the layers being combined through a roll press.
Figure 3:
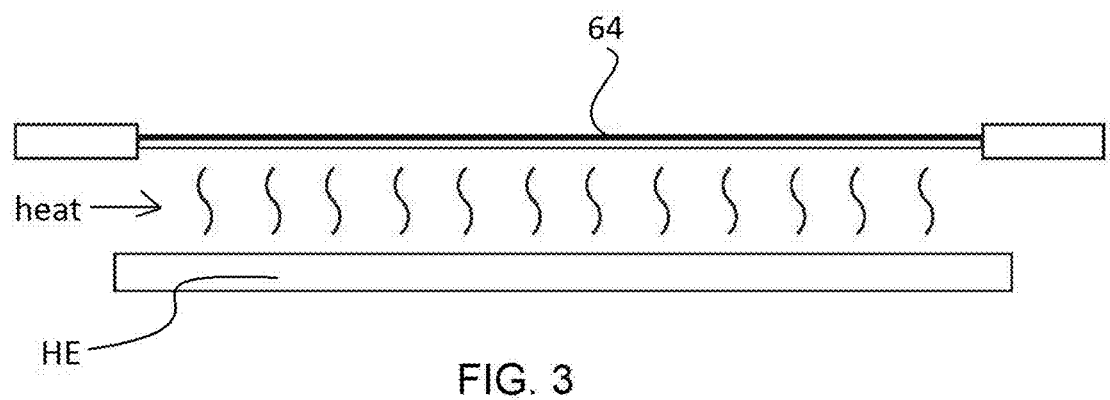
FIG. 3 is a side view of the heating element, heating the layers from the bottom up.
Figure 4:
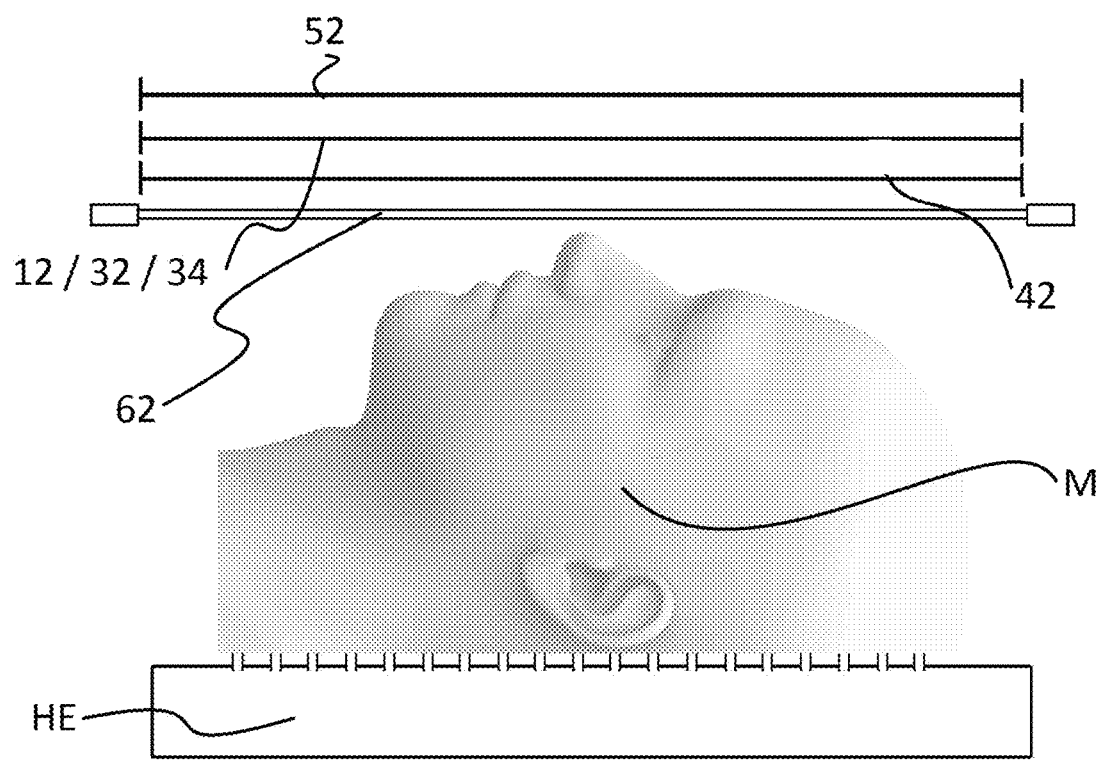
FIG. 4 is a side view of the layers prior to being combined and applied to a 3D model.
Figure 5:
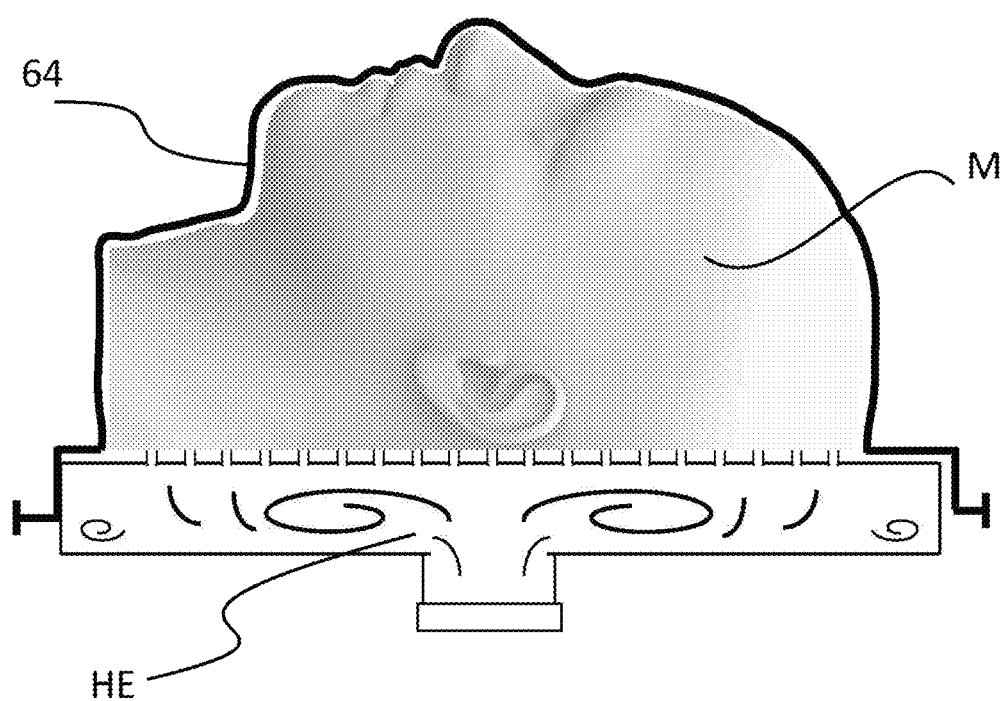
FIG. 5 is a side view of the combined layers applied to a 3D model through a thermoform process.

FIGS. 1-5 illustrate the method 100 according to the invention for applying a two-dimensional ("2D") image onto a two-and-a-half-dimensional ("2.5D") or three-dimensional ("3D") model M. As used in this disclosure, the term "3D model" shall mean a model that has anything more than two dimensions e.g. the method may, for example, apply a 2D image to a model showing 270 degrees of surface area or 5 degrees of surface area.

The method 100 prints a photo using solvent or latex ink onto a vinyl material and then applies that vinyl material to a vacuum formable material, the combination of which is then heated from underneath the materials and applied to the 3D model using a thermoform process.

More specifically, in a first step 10 of the method 100 a photograph 12 is obtained in digital format. There are many conventional photo formats that are acceptable, such as, for example, Tagged Image File Format ("TIFF" or "TIF"), Joint Photographic Experts Group ("JPG" or "JPEG") and Portable Network Graphics ("PNG"). The digital image 12 may be obtained in any number of conventional ways, such as using a digital camera or purchasing the image from any number of known digital photograph websites or shops.

In a second step 20, conventional commercial software is used to render the digital photograph 12 in the desired size, i.e. the size needed for the 3D model. There are a number of acceptable software programs that are known in the art.

In a third step 30, the digital photo 12 is printed on a vinyl material 32 to create an ink impregnated vinyl material 34. A solvent ink or latex ink is used to print the photo, and ideally the vinyl material is flexible and thin. A roll-to-roll type of printer is used so as to impregnate and saturate the vinyl material with ink rather than merely having the ink applied to the top of the vinyl. The ink penetrates into the vinyl, to a depth beneath a top surface of the vinyl but does not penetrate all the way through the vinyl such that it comes through a bottom surface of the vinyl. The thin flexible vinyl 32 is the type of material that allows stretching over at least three quarters of an inch in order to be contorted over the 3D model. There are a number of conventional vinyl materials that are suitable, for example, printable vinyl's such as calendared or cast vinyl that is between 1 millimeter and 8 millimeters in thickness.

In a fourth step 40, the ink impregnated vinyl 34 is run through a conventional laminator where a heat sensitive engineered mastic 42 is applied. More specifically, the engineered mastic is a mastic that is activated under a heat of approximately 185 to 535 degrees Fahrenheit so that the resulting binding is not damaged during the high-heat thermoforming process. Common glues may also be used, however, the bond caused by common glues that are placed between vinyl and a substrate often release due to oily consistency plasticizer found in most substrates and/or vinyl that materialize when exposed to high heats. This high heat engineered mastic helps to strengthen the layering adhesion between the ink impregnated vinyl 34 and to other layers.

In a fifth step 50, the ink impregnated vinyl 34 along with the engineered mastic 42 are run through a thermal laminator where an ultra-violate ("UV") protective laminate 52 is applied as a top coating.

In a sixth step 60, the combination of materials is run through a roll press machine RP where they are applied to a vacuum formable sheet material 62, during which the engineered mastic 42 causes the ink impregnated vinyl material to adhere to the vacuum formable sheet material 62 creating a combination of layers 64. There are a number of suitable materials that may be used as the vacuum formable sheet material 62, including standard or retardant Acrylonitrile-Butadine-Styrene ("ABS"), High Impact Polystyrene, Cast Acrylic, Extruded Acrylic, polyethylene terephthalate ("PET"), polyethylene terephthalate glycol-modified ("PETG"), Polycarbonate, Kydex brand flame retardant sheets, polyvinyl chloride ("PVC"), Polyethylene, Polpropylene, and Minicel L 200 Ethylene-ether foam. The roll press eliminates any air bubbles, which is important for the visual appearance and also because air bubbles expand when exposed to heat and may act as a catalyst for separating the materials during the thermoforming process.

In a seventh step 70 the combination of layers 64 are heated in preparation of being applied to the 3D model. Conventional vacuum forming machines include heating elements HE that are located above the materials, however, for the method 100 it is preferred that the vacuum forming machine be altered to heat this particular combination of material from the bottom up. When the heat is provided from the top down it burns and bubbles the material elements. Heating the combination of materials from the bottom through the substrate reduces damage to the UV laminate and vinyl keeping the degradation to the minimum.

In the eighth step 80, the heated thermoformed material is applied to the 3D model. The 3D model is created using conventional means such as, for example, a Computer Numeric Control ("CNC") machine and/or 3D printer.

It is understood that the embodiments described herein are merely illustrative of the present invention. Variations in the steps of the method may be contemplated by one skilled in the art without limiting the intended scope of the invention herein disclosed and as defined by the following claims.

What is claimed is:

1. A method of applying a two-dimensional image to a three-dimensional model, the method comprising the steps of:
   printing the two-dimensional image onto a vinyl material with ink in a manner that saturates the vinyl material with the ink, the vinyl material having a vinyl top side and a vinyl bottom side;
   providing a vacuum formable sheet that has a vacuum sheet top side and a vacuum sheet bottom side, and applying the vinyl material to the vacuum formable sheet, the vinyl bottom side applied to the vacuum sheet top side;
   providing a heating element and using the heating element to send heat in the direction of the vacuum sheet bottom side, the heating element spaced apart from the vacuum sheet bottom side, and the heat increasing the temperature of the vacuum formable sheet and vinyl material to create a heated combination of layers;
   after heating the heated combination layers applying the heated combination of layers to the model using a thermoform process.

2. The method of claim 1, wherein the ink is a solvent ink or a latex ink.

3. The method of claim 2, wherein the two-dimensional image is printed onto the vinyl using a roll-to-roll printer.

4. The method of claim 1, further comprising the step of:
   after printing the two-dimensional image onto a vinyl material, running the vinyl material through a laminator to apply an engineered mastic to the vinyl material.

5. The method of claim 4, wherein the engineered mastic is a heat-sensitive engineered mastic.

6. The method of claim 5, wherein the engineered mastic is activated under a heat of approximately 185 degrees Fahrenheit to approximately 535 degrees Fahrenheit.

7. The method of claim 4, further comprising the step of:
   after applying an engineered mastic to the vinyl material, applying a ultraviolet laminate as a top coating.

8. The method of claim 7, wherein the ultraviolet laminate is applied using a thermal laminator.

* * * * *